Sept. 5, 1950  F. W. VICKERY  2,521,103
VORTEX SEPARATOR FOR PAPER PULP
Filed Nov. 8, 1949  4 Sheets-Sheet 1
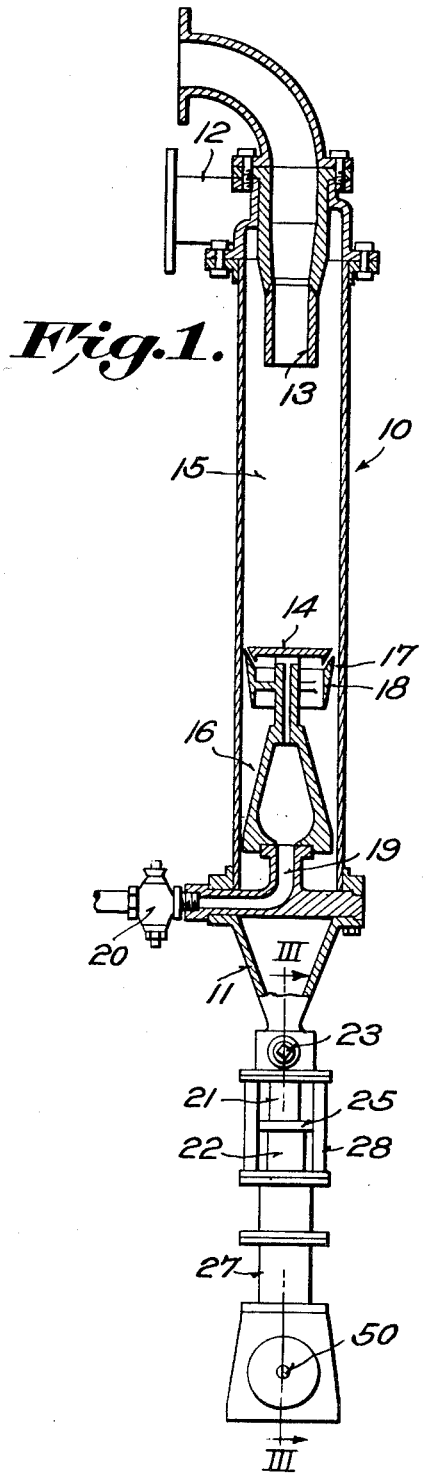
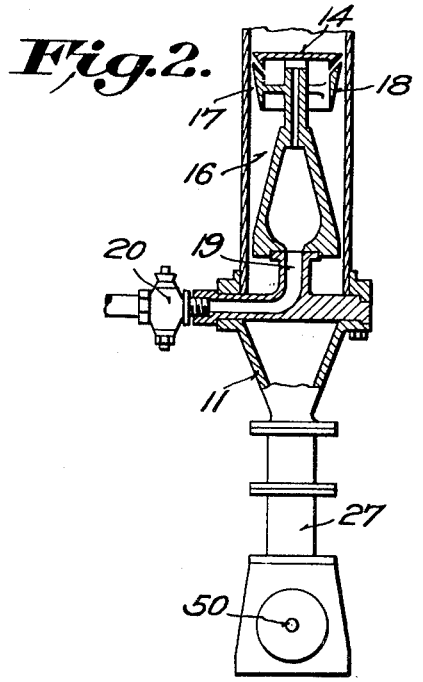
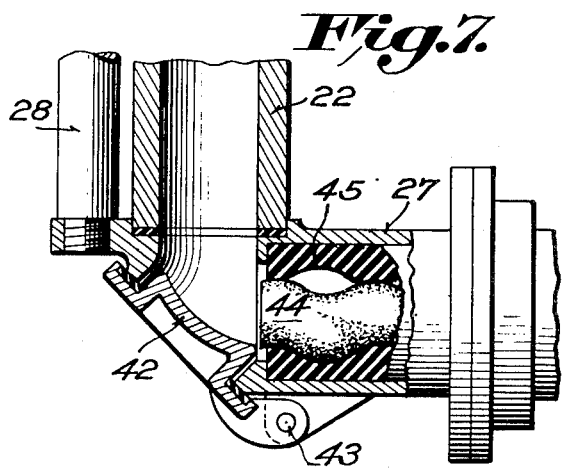
INVENTOR
FREDERICK W. VICKERY, DECEASED,
BY ARTHUR MINUTE
HAROLD E. B. SCOTT
LIONEL A. HUNT
REGINALD W. COVINGTON
ADMINISTRATORS
BY
ATTORNEY Sept. 5, 1950      F. W. VICKERY      2,521,103
VORTEX SEPARATOR FOR PAPER PULP
Filed Nov. 8, 1949      4 Sheets-Sheet 2
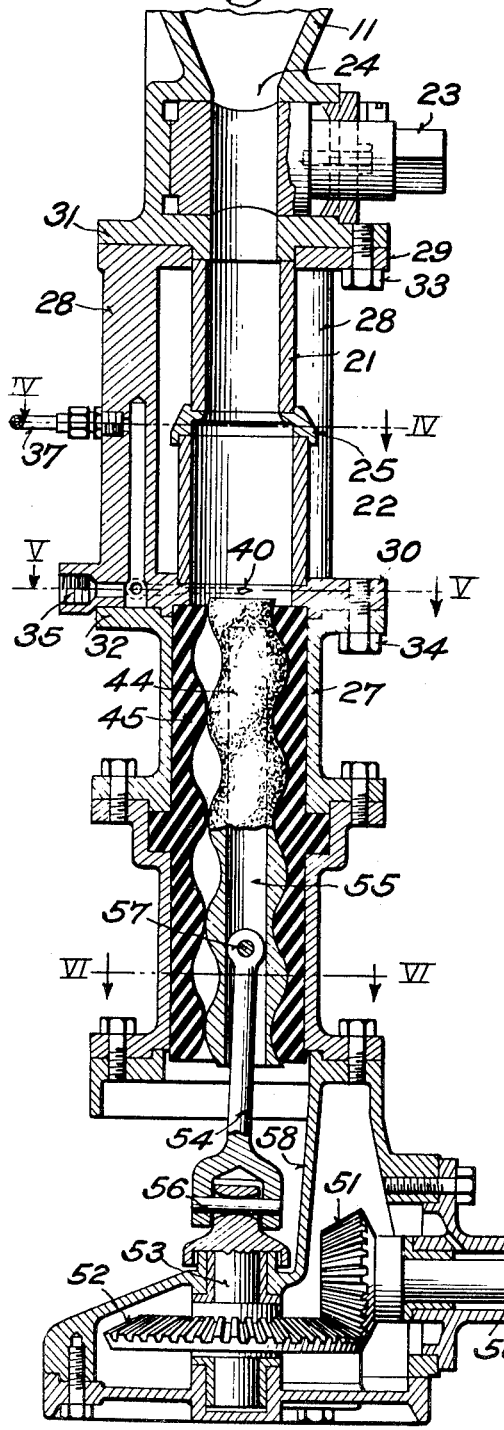
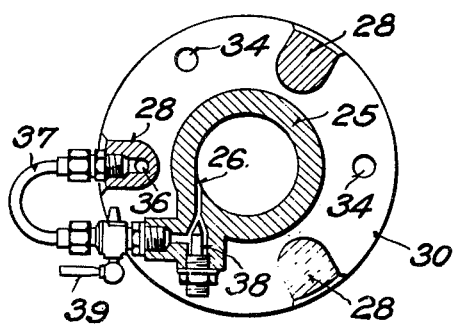
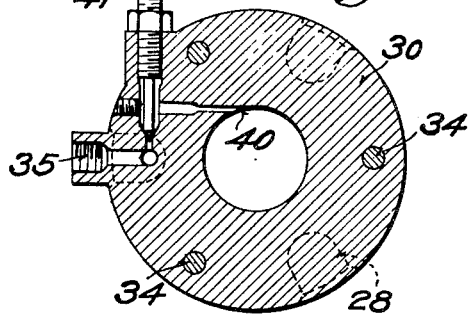
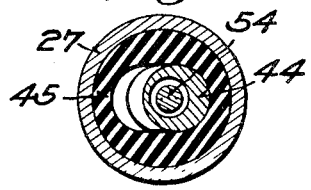
INVENTOR
FREDERICK W. VICKERY, DECEASED,
BY ARTHUR MINUTE
HAROLD E.B. SCOTT
LIONEL A. HUNT
REGINALD W. COVINGTON
ADMINISTRATORS
ATTORNEY Sept. 5, 1950            F. W. VICKERY            2,521,103
VORTEX SEPARATOR FOR PAPER PULP
Filed Nov. 8, 1949            4 Sheets-Sheet 3
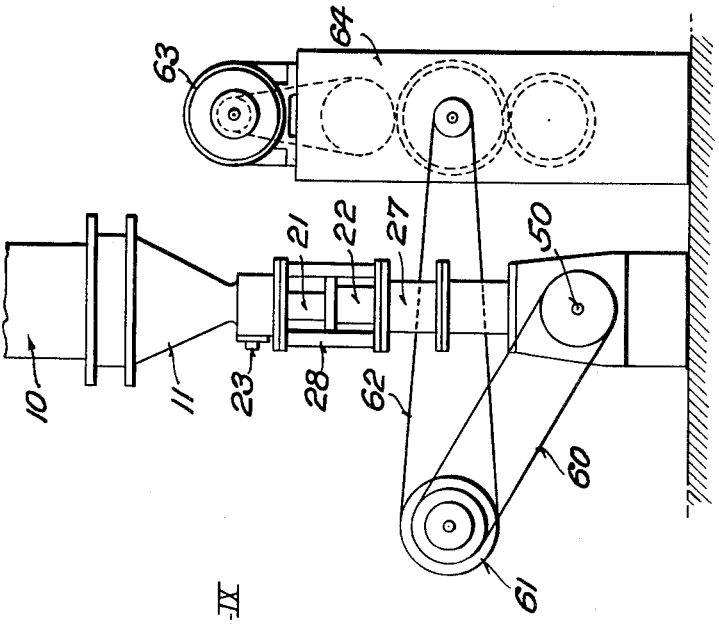
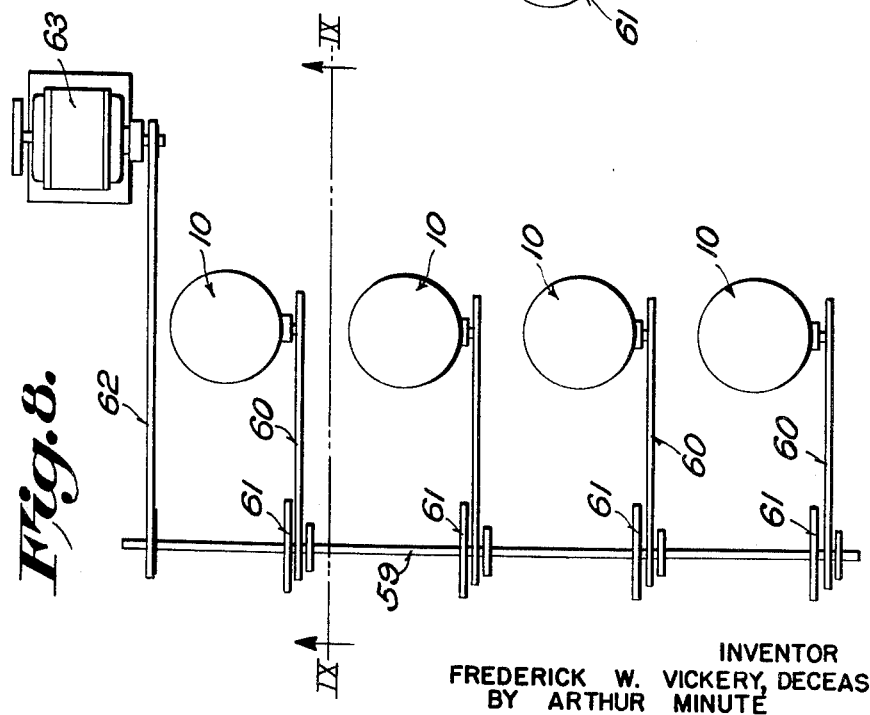
INVENTOR
FREDERICK W. VICKERY, DECEASED,
BY ARTHUR MINUTE
HAROLD E. B. SCOTT
LIONEL A. HUNT
REGINALD W. COVINGTON
ADMINISTRATORS
BY *Ross A. Sursey*
ATTORNEY

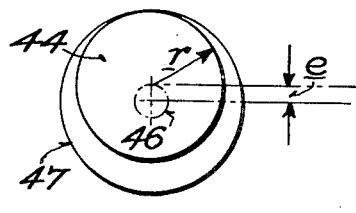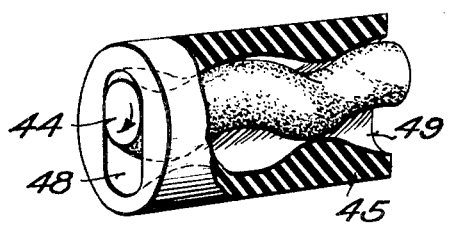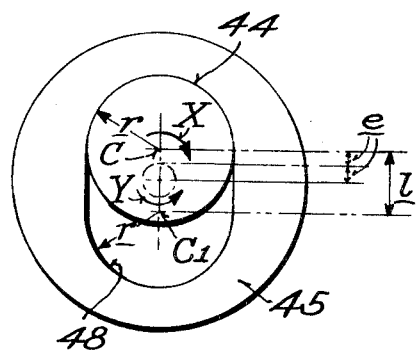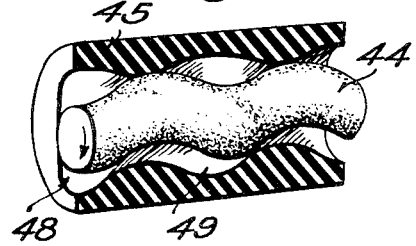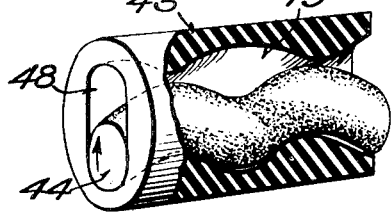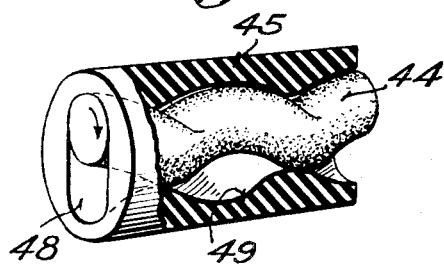

Patented Sept. 5, 1950

2,521,103

UNITED STATES PATENT OFFICE 2,521,103

VORTEX SEPARATOR FOR PAPER PULP

Frederick William Vickery, deceased, late of Guildford, England, by Arthur Minute, Wandsworth Common, London, Harold Eric Baliol Scott, Hayes, Lionel Alexander Hunt, Fulham, London, and Reginald Wilfrid Covington, Woodford Green, England, administrators Application November 8, 1949, Serial No. 126,124
In Great Britain September 15, 1948

8 Claims. (Cl. 92—28)

This invention relates to vortex separators for paper pulp, of the kind comprising a cylindrical vortex vessel having a tangential pulp inlet at its upper end and a central pulp outlet pipe, extending through the upper end of the vortex vessel to a distance well below the inlet.

As is well known undesirabe matter is separated centrifugally from the good pulp in such separators and sinks to the bottom of the vortex vessel, the good pulp being removed through the outlet pipe.

By the expression "undesirable matter" as used herein we include not only "dirt" in the ordinary sense of material other than fibre, but also such fibre as may be commingled inextricably with the dirt. A dirt particle, for example, may be attached to a fibre or to a bundle of fibres. In either case it is essential that the dirt particle be eliminated, and if fibres are contained with it, they become, as much as the dirt itself, "undesirable matter."

The removal of undesirable matter from the separator introduces difficult problems. One method of dealing with the problem is to provide beneath the vortex vessel, as described for example in Scott's U. S. Patent No. 2,375,826, a separate vessel constituting a sump, and periodically to close a valve controlling communication between the vortex vessel and the sump, empty the sump, refill it with water and finally reopen the valve. This, however, involves the disadvantage that there is necessarily a substantial period of time during which the whole action of the separator is distorted and largely nulified. Moreoer, the valve must be adjusted, e. g., by fitting it with interchangeable throughgoing sleeves of varying bore, to suit the class of work, since the bore of the valve, when open, should be small when dealing with high grade stock, to prevent an undue amount of good stock passing down into the sump and so being wasted, while in the case of a lower grade stock, such as a roofing paper furnish, which may contain large pieces of undesirable matter a much larger bore is needed to permit of passage of the undesirable matter into the sump.

The interchangeable sleeves employed for the purpose may provide a range of bores extending between, say ½" and ¾" in diameter and, by using no sleeve at all, the full bore of, say, 1¼" diameter of the valve is available for use. It is an inconvenience to have to change the sleeve when a new class of material is to be treated, and the extent of variation in the bore of the valve is limited by the number of different sleeves available. Furthermore, in the case where high grade stock is being treated, it is advisable to use the sleeve of minimum bore, as this serves, surprisingly enough, not only to reduce to a minimum the amount of good fibre which is drawn down into the sump but also to remove the maximum of undesirable matter from the separator. A sleeve of fine bore is, however, liable to plugging with consequent interruption of the effective operation of the separator.

Investigation has shown, as mentioned in U. S. application, Ser. No. 2,064, filed January 13, 1948, that optimum performance of the separator, over the range of widely different conditions under which it must operate in practice, is obtained by removing undesirable matter from the separator at a rate substantially equal to that at which such matter accumulates in the bottom of the separator. That is not to say that no accumulation at all of undesirable matter in the bottom of the separator is permissible. On the contrary some initial accumulation of such matter is unobjectionable, provided the amount of undesirable matter at the bottom of the separator is prevented from accumulating to an excessive extent. Moreover, some small accumulation of undesirable matter at the bottom of the separator or in an inspection chamber fitted to the bottom of the separator is desirable to enable, as indicated below, an attendant to observe and regulate properly the amount of material removed by the automatic extractor the subject of this invention. The accumulation of undesirable matter should, however, be held, for best results, to the minimum consistent with such observation.

According to the present invention we provide for automatic and continuous extraction of undesirable matter from a large hole in the bottom of the separator by an extractor which can be operated at varying speeds to suit different classes of work and so enable the rate of removal of undesirable matter from the separator to be adjusted to suit the rate of separation of such matter from the stock. Such an automatic extractor must operate, as pointed out in application Serial No. 2,064 under conditions such that ingress of air to the separator is prevented and currents such as would disturb effective operation of the separator are avoided. Further researches have shown that another desideratum is that no leakage of water can take place through the extractor. If water can so leak, the concentration of undesirable matter at the bottom of the separator may, in time, become so high that the extractor can no longer operate, with the result that the machine must be stopped and the accumulated undesirable matter removed in some other way.

The invention accordingly provides a method of operating a vortex separator for paper pulp of the kind specified, which comprises continuously extracting, by means of a variable speed extractor, undesirable matter from a large hole at the bottom of the separator at a rate which coincides substantially with the rate of separation in the separator of undesirable matter from the stock and under conditions such that ingress of air to the separator is prevented, currents such as would disturb effective operation of the separator are avoided, and leakage of water through the extractor is prevented.

The invention includes a vortex separator of the above kind which includes a continuously operable extractor for removing undesirable matter from the vortex vessel through a large hole in the bottom thereof, the extractor comprising an elongated stator communicating directly, or by means of an inspection vessel disposed between the base of the separator and the stator, with the hole in the vortex vessel, a rotor which forms a watertight seal with the stator but which, when rotated, will cause liquid to flow out of the separator and through the extractor in the general direction of the axis of the stator while preventing ingress of air into the separator, and a variable speed driving mechanism for rotating the rotor. Preferably the stator is external to the rotor and it is preferred to make either the rotor or the stator of rubber. This permits of a very effective water seal, since the parts can be so close a fit that the rubber part will be deformed to some extent as the rotor rotates, while nevertheless allowing of sufficient freedom of rotation of the rotor in relation to the stator.

By virtue of the water tight seal, there is no leakage of water from the separator, the only water removed being that carrying undesirable matter in suspension, which is withdrawn by rotation of the rotor. There is therefore no tendency, under normal conditions, for the undesirable matter to settle in the base of the separator to such an extent as to render the extractor ineffective. Furthermore, the rate of removal of undesirable matter may be readily adjusted to suit the class of work being performed and the rate of separation of undesirable matter by varying the speed of rotation of the rotor.

It is possible to fit the extractor directly to the base of the vortex vessel, the lower portion of which is normally of downwardly tapering conical form. The part of the apparatus from which liquid is drawn by the extractor will normally be made of, or fitted with, a window of transparent material so that the operator may observe the extent of accumulation of undesirable matter and regulate the speed of rotation of the rotor so as to keep the undesirable matter at a given level, increasing the speed if the level tends to rise unduly and decreasing it if the level tends to fall to such an extent as to cause good fibres to be withdrawn by the extractor. It is not, however, easy to view the level of undesirable matter through a conical or part conical window so we prefer to provide a cylindrical inspection chamber of transparent material, or having a transparent window, below the separator and in axial alignment therewith, and to fit the extractor to the base of the inspection chamber. This arrangement not only facilitates judgment of the level of undesirable matter but also has the advantage that the vortex action in the inspection chamber is less marked than in the lower portion of the extractor. A further advantage of using an inspection chamber is that it is then possible to introduce a tangential water jet into the lower end of the inspection chamber for the purpose indicated below. It would not be permissible to introduce a water jet into the lower part of the separator itself, as it would interfere with proper operation of the separator.

The inspection chamber should not be of unduly large diameter, otherwise the extractor will tend to withdraw material from the central part of the inspection chamber only, leaving a film of heavy undesirable matter on the walls thereof which will obscure observation of the level of undesirable matter in the inspection chamber. No such tendency occurs, however, when the bore of the inspection chamber is substantially the same as, or at least does not greatly exceed that of the bore of the stator of the extractor.

As above noted, it is advisable to allow sufficient accumulation of undesirable matter in the inspection chamber to enable the attendant to judge its level and effect adjustment, appropriate to change in the level, of the speed of the extractor. Were no accumulation at all permitted, the extractor might operate too fast and withdraw good fibres without this being noticed by the attendant. However, the accumulation of undesirable matter in the inspection chamber is preferably held to the minimum consistent with proper regulation of the speed of the extractor and assurance that no good fibre will be removed by the extractor.

Despite the fact that the extractor provides a water tight seal there may from time to time be a tendency for undesirable matter to settle in the base of the inspection chamber, either due to inadvertence or misjudgment on the part of the attendant, or to temporary increase in the rate of delivery of undesirable matter from the separator to the inspection chamber, or to the fact that especially intractable material is being handled. To care for this contingency it is desirable to provide a tangential water jet at the base of the inspection chamber, close to the inlet of the extractor, through which water can be supplied from time to time to stir up the undesirable matter in those exceptional cases where excessive settling of the undesirable matter is noticed.

It has been mentioned that the bore of the inspection chamber is important, and that it should not greatly exceed the bore of the stator of the extractor as otherwise there will be stagnation in the outer layers of the material in the inspection chamber which will lead to obscuration of the window. The length of the inspection chamber is also important. As above noted, the inspection chamber has a desirable effect of reducing the velocity of whirl of the material removed by the extractor. It must not, however, be too long as otherwise there will be stagnation and deposition of heavy undesirable matter to an extent which might impede proper observation of the contents of the inspection chamber and interfere with effective operation of the extractor. Nor should the inspection chamber be too short, as it would then be difficult to see what is taking place within it. An inspection chamber longer than that theoretically ideal from the viewpoint of optimum velocity of whirl of the material withdrawn by the extractor can be employed if there be provided at one or more points intermediate in the length of the inspection chamber, a tangential water jet or jets which operate continuously to feed water into the inspection chamber and so serve to speed the stock up and, by the impact effect of the injected water, to break up aggregations of fibres entrained with the dirt particles, thereby releasing the good fibres from such aggregations and allowing them to return to the separator.

The extractor is preferably arranged to withdraw liquid downwardly from the bottom of the separator or inspection chamber but it may, as an alternative, operate to withdraw liquid horizontally from the bottom of the separator or inspection chamber. The extractor is, moreover, preferably employed in conjunction with a vortex type separator in which, as described for example in the above noted patent of Scott, a baffle, located below the outlet pipe, divides the vortex vessel into an upper vortex chamber and a lower separating chamber and operates to restrict the flow of material from the vortex chamber to the separating chamber.

Some specific embodiments of the invention will now be described in detail, by way of example, with reference to the accompanying drawings, in which:

Figure 1 is a side elevation, partly in section, of a vortex type separator fitted with an inspection chamber, located below the vortex vessel, and an extractor below the inspection chamber;

Figure 2 is a similar view of an alternative form of separator in which the extractor is fitted directly to the lower end of the vortex vessel;

Figure 3 is a section, on an enlarged scale, taken on the line III—III in Figure 1;

Figures 4, 5 and 6 are sections taken respectively on the lines IV—IV, V—V and VI—VI in Figure 3;

Figure 7 is a section taken through the lower end of an alternative arrangement in which the extractor extends horizontally from the lower end of the inspection chamber;

Figure 8 is a diagrammatic plan view showing a battery of separators, the extractors of which are driven by a common motor;

Figure 9 is a section on the line IX—IX in Figure 8;

Figures 10 and 11 are diagrams illustrating the operation of the extractor; and

Figures 12–15 are perspective views, partly broken away, of the extractor showing successive positions assumed by the rotor in the stator.

Like reference characters designate like parts throughout the Figures.

Turning first to Figures 1 and 3, the separator comprises a cylindrical vortex vessel 10, of 6" internal diameter and a downwardly tapering conical lower portion 11. The vortex vessel has, at its upper end, a tangential inlet 12 for the pulp to be purified and a central outlet pipe 13 for purified pulp, which extends down into the vortex vessel 10 to a position well below the inlet 12. The vortex vessel 10 is divided, as described in U. S. Patent No. 2,375,826, by a baffle 14 into a vortex chamber 15, above the baffle, and a separating chamber 16, below the baffle. The baffle 14 provides for restricted flow of material from the vortex chamber 15 to the separating chamber 16 through the narrow annular space 17 surrounding the baffle. Material rising from the separating chamber 16 into a skirt 18 below the baffle may be withdrawn, through an outlet pipe 19 controlled by a cock 20, for further purification in an auxiliary separator as described in U. S. Patent No. 2,375,826.

In contradistinction to the separator described in that U. S. patent the conical lower end 11 of the separating chamber does not communicate with a large sized sump but with a cylindrical inspection chamber, axially aligned with the separator and consisting of two superposed cylinders 21, 22 of transparent material. The upper cylinder is about 1¼" in inside diameter and communicates with a hole 24 (Figure 3) of the same bore in the base of the conical portion 11 of the settling chamber. The hole is provided with an isolating valve 23 which is normally open, so as not to obstruct the hole, but can be closed to isolate the inspection chamber from the separator. The lower cylinder 22 is of somewhat larger diameter, e. g., about 1½" so as to reduce to a minimum any tendency to plugging of undesirable matter in the inspection chamber. The cylinders 21, 22 are joined by a metal ring 25 having in it a tangential jet 26 (Figure 4) through which water is constantly supplied to the inspection chamber for the purpose of speeding the stock up and breaking up aggregations of fibres entrained with dust particles, as explained above.

The extractor, which will be described later, is disposed in a housing 27 disposed beneath the inspection chamber and in axial alignment therewith. The transparent cylinders 21, 22 are relieved of loads by spaced metal pillars 28, fixed to flanges 29, 30 fitted respectively, by bolts 33, 34 (Figure 3), to flanges 31, 32 at the base of the separator and on top of the housing 27.

A water inlet 35 is provided in the flange 30 and a continuous flow of water to the tangential jet 26 (Figure 4) in the metal ring 25 is provided through a duct 36 in one of the pillars 28 and a pipe 37. The flow through the inlet 26 is controlled by an adjustable needle 38 (Figure 4) and can be cut off, if desired, by a cock 39.

A further tangential water jet 40 (Figure 5) is provided at the base of the inspection chamber in the flange 30. As explained above, this jet is only used occasionally, for the purpose of stirring up the undesirable matter if it accumulates to an excessive extent in the inspection chamber. The jet 40 is therefore normally cut off from the water inlet 35 by a valve 41 which can be opened when it is desired to use the jet 40.

The separator shown in Figure 2 is identical with that in Figure 1, except that the inspection chamber is omitted, the housing 27 of the extractor being fitted directly to the lower end of the conical portion 11 of the separating chamber.

Again, in the cases so far considered, the housing 27 of the extractor is axially aligned with the separator. This, however, is not essential. Thus Figure 7 shows a case in which the housing 27 of the extractor extends horizontally, i. e., at right angles to the lower cylinder 22 of the inspection chamber. In this case a removable plug 42, hinged to the housing 27 at 43, is provided for obtaining access to the interior of the inspection chamber.

In all of the arrangements illustrated, the extractor is constituted by the rotor 44 and stator 45 of what is known as the Mono or Moyno pump.

The rotor 44 is of metal, and constituted by a twisted member of circular section throughout, the centres of successive sections of the rotor lying on a helix, the radius of which is termed the eccentricity $e$ of the rotor. Figure 10 shows an end elevation of the rotor 44 of radius $r$, the helix being represented, as seen in end elevation, by the circle 46 of radius $e$. The circle 47 is the circle circumscribing the circles of radius $r$ struck from various points on the circle 46.

The stator 45 is a rubber tube having a bore 48 of uniform section throughout its length, this section being a figure bounded by two semi-circles, each of the same radius $r$ as the rotor, joined by two common tangents. This figure is shown in Figure 11, which is a diagrammatic end elevation of the rotor and stator, the centres of the two semi-circles being shown at $c, c_1$. The length $l$ of each tangent, i. e., the distance between the centres $c, c_1$ of the semi-circles, is four times the eccentricity $e$ of the rotor. The stator 45 is also twisted so that the bore therein assumes the form of a double screw thread 49 (Figure 12), having half as many convolutions in a given length as the rotor. In such a pump the rotor 44 completely seals the bore 48 in the stator 45 along a helical line of seal. When, however, the rotor 44 is rotated, in the direction of the arrow in Figures 12–15, each cross section thereof travels at each revolution of the rotor, to and fro across the corresponding section of the stator in a straight line.

This is illustrated in Figures 12–15 which shows that, in one half revolution of the rotor, the end cross-section of the rotor has traveled from top to bottom of the bore 48 in the stator. The drive is imparted to the rotor 44 from a shaft 50 (Figure 3) driven by a variable speed driving motor through bevel gears 51, 52, a stub shaft 53 and a link 54 extending up into a bore 55 in the lower end of the rotor. The link 54 is pivoted at its opposite ends to the stub shaft 53 and to the rotor 44 by pins 56, 57 extending at right angles to one another. A cover 58 encloses the gears 51, 52 so as to protect them from the material extracted through the bore in the stator by rotation of the rotor.

The straight line path of each section of the rotor is compounded of a rotation of the rotor about its axis, imparted by the driving mechanism for the rotor, as indicated by the arrow X in Figure 11, and a simultaneous circular motion of the axis of the rotor in the opposite direction, as indicated by the arrow Y in Figure 11, due to the intermeshing of the rotor and stator. It is for this reason that the rotor is driven through the double universal drive provided by the pins 56, 57.

As the rotor rotates, the helical line of seal between the rotor and stator travels continuously through the stator, as may be seen from Figures 12–15, and re-establishes itself at the inlet end of the stator. A continuous extraction action is thus produced.

Such an extractor withdraws liquid from the separator along a helical path but in the general direction of the axis of the rotor, the action being somewhat similar to that of a worm, and we find that only by arranging that the liquid will be extracted from the separator in the general direction of the axis of the rotor, as distinct from in a peripheral direction, as it would for example by a rotor in the form of a paddle wheel, is it possible to achieve a sufficiently effective water seal.

The extractor serves to hold back the liquid which would otherwise flow out of the bottom of the separator, and allows it, when the rotor is rotating, to escape at a measured rate and under conditions such that there are no small static orifices to be traversed which could be plugged by the undesirable matter. It will be understood that the "pump" used in this invention is perfectly capable of functioning as a pump, that is, of picking up material below atmospheric pressure and delivering it against a substantial head. Its action in this case is not that of a pump but rather that of a valve in that it reduces and retards the rate at which fluid can leave the observation chamber and, through the speed of the rotor, this rate is accurately adjustable over a wide range.

The rotor fits sufficiently closely in the stator to cause some degree of deformation of the rubber of the stator as the rotor rotates.

It is often convenient to provide a group of separators side-by-side. In this case the extractors of all the separators can be driven, as shown in Figures 8 and 9, from a common shaft 59, each by a belt 60 which can be coupled to one of a number of pulleys 61 providing for different speeds of drive from the shaft 59 to the driving shaft 50 of the extractor. The shaft 59 is driven, by a belt 62, from an electric motor 63 through a variable speed gear box 64.

The inspection chamber may embody more than two transparent cylinders. For example it may be constituted by three transparent cylinders which increase progressively in diameter, the smallest cylinder being at the top and adjoining cylinders being separated by metal rings, each provided with a tangential water inlet.

In absolute volume the rate at which impurities accumulate is quite small and of course the removed impurities are quite highly concentrated and present a wide variety of solid particles. The fact that the pump used herein affords a positive seal prevents an excessive rate of removal due to static head within the observation tube and this type of pump is almost impossible to clog since due to its peculiar construction a half-inch ball can be passed entirely through the pump. A screw conveyor as shown in Application Serial No. 2,064 does not afford a positive seal since any such conveyor always provides a complete helical channel through which liquid can flow under the impetus of a static head and no other known type of rotary or centrifugal pump would be effective for the low absolute volumes here encountered.

What is claimed is:

1. A vortex separator for paper pulp comprising in combination: a cylindrical vortex chamber; an inspection chamber for receiving undesirable material extracted in said vortex chamber; an open duct connecting said chambers; a valve at the end of said inspection chamber opposite said duct, said valve comprising a movable element and a stationary element, said elements coacting to form a complete seal against egress from said inspection chamber; and means for moving said movable element at a predetermined constant speed, said elements coacting to cause undesirable material to flow from said inspection chamber at a constant rate regardless of the static head within said inspection chamber.

2. A vortex separator for paper pulp as set forth in claim 1 in which a portion, at least, of the inspection chamber is transparent.

3. A vortex separator for paper pulp as set forth in claim 2 in which said inspection chamber has a tangential jet adjacent said valve.

4. A vortex separator for paper pulp as set forth in claim 3 in which said inspection chamber has at least one tangential jet operating intermediate the ends of the transparent portion.

5. A vortex separator for paper pulp comprising in combination: a cylindrical vortex chamber, said chamber having an orifice at its lower end to pass undesirable matter separated in the chamber and a valve for regulating the rate of flow through said orifice, said valve comprising a movable element and a stationary element, said elements coacting to form a complete seal against egress through said orifice and means for moving said movable element at a predetermined constant speed, and elements coacting to cause undesirable matter to flow from said inspection chamber at a constant rate regardless of the static head within said vortex chamber.

6. A vortex separator for paper pulp as set forth in claim 5 including means to adjust the speed of said movable element.

7. A vortex separator for paper pulp comprising in combination: a cylindrical vortex chamber; an inspection chamber for receiving undesirable material extracted in said vortex chamber; an open duct connecting said chambers; a valve at the end of said inspection chamber opposite said duct, said valve comprising a movable element and a stationary element, said elements coacting to form a complete seal against egress from said inspection chamber; and means for moving said movable element at a predetermined constant speed, said elements coacting to cause undesirable material to flow from said inspection chamber at a constant rate regardless of the static head within said inspection chamber and means for adjusting the speed of said movable element.

8. A vortex separator for paper pulp comprising in combination: a cylindrical vortex chamber; an inspection chamber for receiving undesirable material extracted in said vortex chamber; an open duct connecting said chambers; a valve at the end of said inspection chamber opposite said duct, said valve comprising a movable element and a stationary element, said elements coacting to form a complete seal against egress from said inspection chamber; and means for moving said movable element at a predetermined constant speed, said elements coacting to cause undesirable material to flow from said inspection chamber at a constant rate regardless of the static head within the said inspection chamber, a portion at least of said inspection chamber being transparent and at least one tangential jet located in said inspection chamber intermediate the ends of the transparent portion.

ARTHUR MINUTE,
HAROLD ERIC BALIOL SCOTT,
LIONEL ALEXANDER HUNT,
REGINALD WILFRID COVINGTON,
*Administrators of the Estate of Frederick William Vickery, Deceased.*

REFERENCES CITED

The following references are of record in the file of this patent:

UNITED STATES PATENTS

| Number | Name | Date |
|---|---|---|
| 1,904,062 | Laughlin et al. | Apr. 18, 1933 |
| 2,028,407 | Moineau | Jan. 21, 1936 |
| 2,085,115 | Moineau | June 29, 1937 |
| 2,269,189 | Downs | Jan. 6, 1942 |
| 2,329,386 | Brennan | Sept. 14, 1943 |
| 2,375,826 | Scott | May 15, 1945 |
| 2,379,411 | Berges | July 3, 1945 |
| 2,463,341 | Wade | Mar. 1, 1949 |

FOREIGN PATENTS

| Number | Country | Date |
|---|---|---|
| 294,541 | Germany | Oct. 13, 1916 |